(12) United States Patent
Schlegel

(10) Patent No.: US 7,221,960 B2
(45) Date of Patent: May 22, 2007

(54) MOBILE TELEPHONE DEVICE COMPRISING MULTIWIRE ELECTRICAL CONNECTION DEVICES

(75) Inventor: Thomas Schlegel, Nuremberg (DE)

(73) Assignee: Audioton Kabelwerk GmbH, Nuremberg (DE)

( * ) Notice: Subject to any disclaimer, the term of this patent is extended or adjusted under 35 U.S.C. 154(b) by 363 days.

(21) Appl. No.: 10/469,760

(22) PCT Filed: Mar. 16, 2002

(86) PCT No.: PCT/DE02/00951

§ 371 (c)(1),
(2), (4) Date: Sep. 4, 2003

(87) PCT Pub. No.: WO02/076793

PCT Pub. Date: Oct. 3, 2002

(65) Prior Publication Data

US 2004/0097274 A1    May 20, 2004

(30) Foreign Application Priority Data

Mar. 21, 2001    (DE) ................. 101 13 905

(51) Int. Cl.
*H04M 1/00*    (2006.01)
(52) U.S. Cl. ................ 455/556.1; 455/556.2; 455/557; 455/569.2; 455/569.1; 455/575.6; 455/575.9; 361/760; 361/761; 361/762

(58) Field of Classification Search ............. 455/556.1, 455/556.2, 557, 569.1, 569.2, 575.1, 575.6, 455/575.9; 361/760, 761, 301, 746, 750, 361/795
See application file for complete search history.

(56) References Cited

U.S. PATENT DOCUMENTS 4,819,131 A * 4/1989 Watari ................. 361/794

(Continued)

FOREIGN PATENT DOCUMENTS

DE    4107996    9/1992

(Continued)

*Primary Examiner*—Joseph Feild
*Assistant Examiner*—Khai Nguyen
(74) *Attorney, Agent, or Firm*—Fulbright & Jaworski LLP; Jan K. Simpson

(57) ABSTRACT

Described is a high-frequency connecting device comprising a first connecting element and a second connecting element which in the connecting position are in electrical contact without engaging into each other, forming a coaxial connection. The first connecting element and the second connecting element each have a respective plurality of separate outer conductors which are arranged at a spacing relative to each other and which are respectively arranged at a spacing around an inner conductor. In the electrical connecting position the mutually facing contact ends of the outer conductors are in touching contact. At the same time the mutually facing contact ends of the inner conductors are in touching contact. The outer conductors and the inner conductor of the second connecting element are in the form of resilient contact pins while the outer conductors and the inner conductor of the first connecting element are in the form of non-resilient fixed contact pins and lie with their contact ends in a common contact plane.

24 Claims, 6 Drawing Sheets

U.S. PATENT DOCUMENTS

| | | | |
|---|---|---|---|
| 5,274,917 A | | 1/1994 | Corbett, III et al. |
| 5,618,189 A | | 4/1997 | Jin et al. |
| 5,732,361 A | * | 3/1998 | Liu .......................... 455/569.2 |
| 5,764,026 A | * | 6/1998 | Issa ............................ 320/104 |
| 5,788,516 A | | 8/1998 | Uggmark |
| 5,956,399 A | * | 9/1999 | Whitley et al. ............. 379/446 |
| 5,995,622 A | * | 11/1999 | Roussy et al. .............. 379/446 |
| 6,340,320 B1 | * | 1/2002 | Ogawa ....................... 439/824 |
| 6,373,715 B1 | * | 4/2002 | Zeng et al. ................. 361/760 |
| 2003/0148740 A1 | * | 8/2003 | Yau et al. ..................... 455/90 |

FOREIGN PATENT DOCUMENTS

| | | |
|---|---|---|
| DE | 689 10 184 | 5/1994 |
| DE | 198 44 730 | 6/2000 |
| DE | 695 13 512 | 7/2000 |
| DE | 199 14 341 | 10/2000 |
| DE | 299 15 180 | 1/2001 |
| DE | 199 45 176 | 5/2001 |
| EP | 0 578 099 | 1/1994 |
| EP | 1 039 588 | 9/2000 |
| FR | 2 783 639 | 3/2000 |
| GB | 2 303 747 | 2/1997 |

* cited by examiner

Fig. 5a
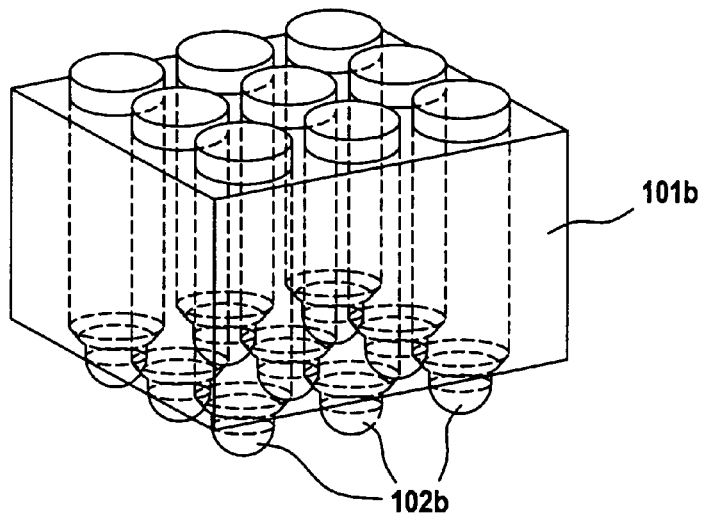
Fig. 5b
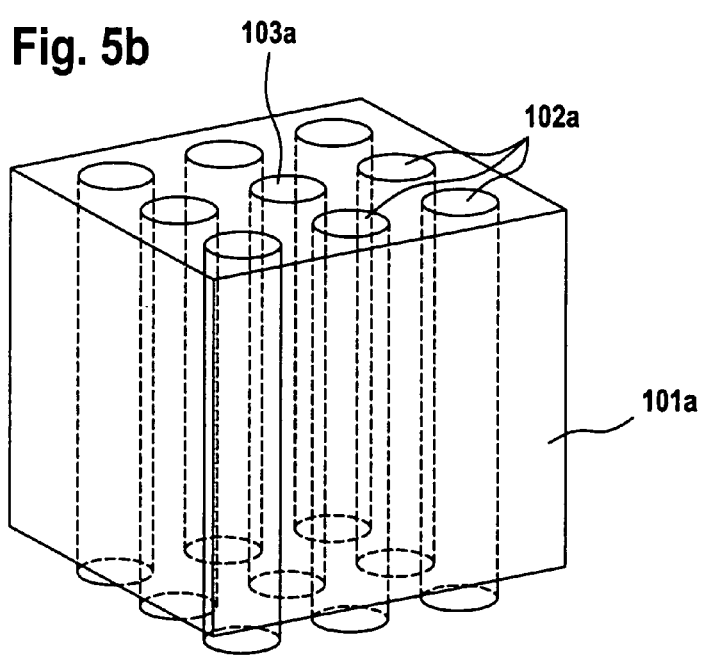
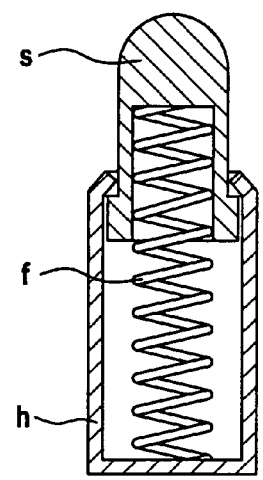
Fig. 6

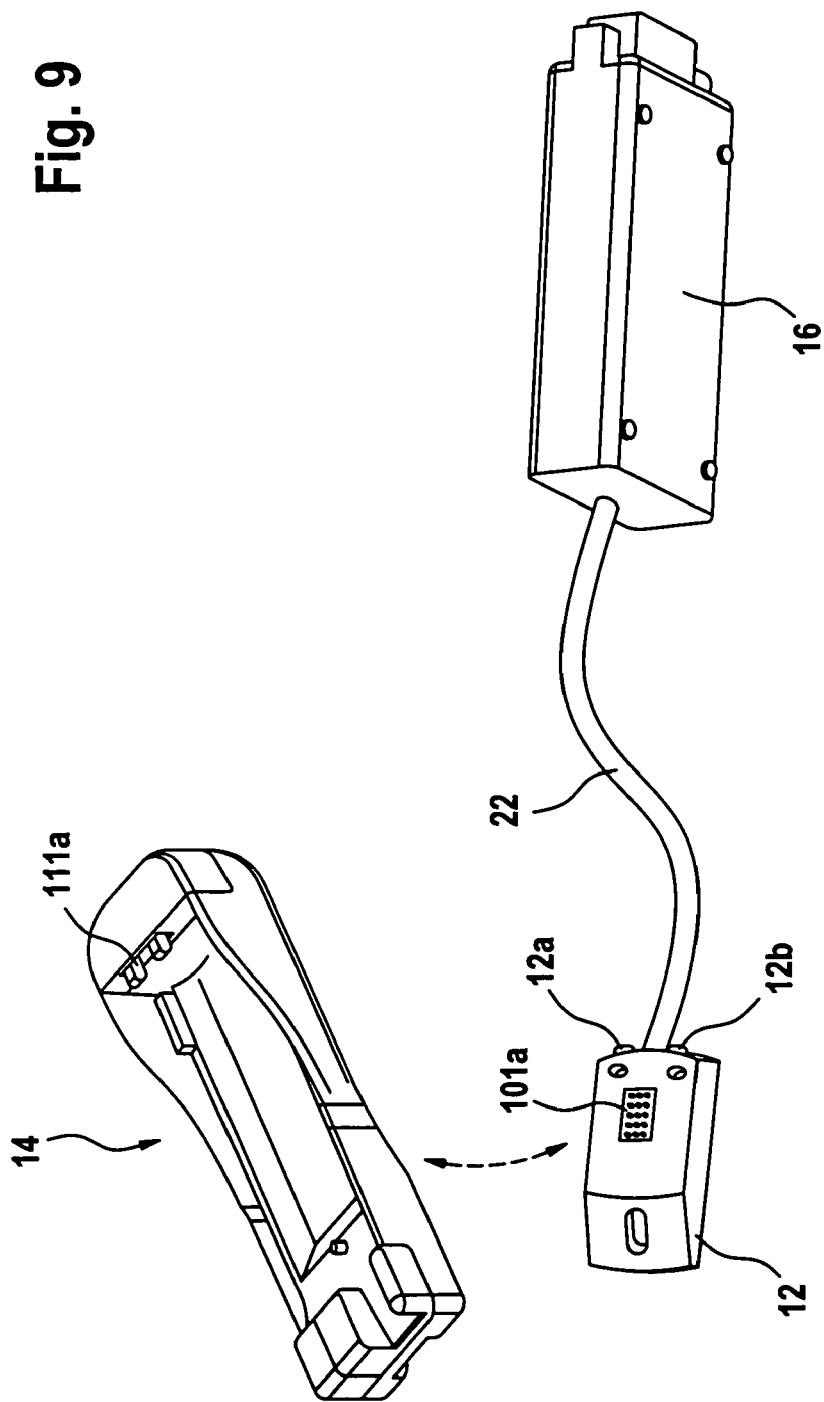

MOBILE TELEPHONE DEVICE COMPRISING MULTIWIRE ELECTRICAL CONNECTION DEVICES

CROSS-REFERENCE TO RELATED APPLICATIONS

This is a continuation of PCT patent application No. PCT/DE02/00951, filed Mar. 16, 2002, which claims priority to German patent application number 10113905.5, filed Mar. 21, 2001.

TECHNICAL FIELD

The invention concerns a mobile telephone device as set forth in the classifying portion of claim 1.

BACKGROUND OF THE INVENTION

German utility model DE 299 15 180 discloses mobile telephone units with connecting devices between the mobile telephone unit and an external connector arrangement such as a motor vehicle connection, data plug, mains unit or the like. The mobile telephone unit is electrically conductively connected to the external connector arrangements by the connecting devices. The described electrical connecting device is subdivided into two regions, wherein the one region comprises loop-shaped spring contacts and the other region is of a coaxial structure with loop-shaped or sleeve-shaped external contacts. In the known design, the contact elements are of a specific configuration, depending on the respective nature of the transmitted signal, that is to say depending on whether the situation involves an antenna coaxial contact or a supply voltage contact.

Another connecting device is described in DE 689 10 184 T2. That connecting device comprises a plug fitted to the end of the antenna cable and a guide passage with contacts which is arranged in or on a radio unit.

An electrically conductive contact is achieved by pushing the plug into the guide passage. A connection cannot be formed by simply placing the radio unit on to the plug, but the plug and the guide passage must be pushed one into the other.

A further connecting device is disclosed in DE 198 44 730 A1. It serves for connecting a mobile radio unit to an external antenna. The structure of the connecting device is coaxial and the arrangement does not include any connecting elements for transmitting further signals, such as for example supply voltages.

DE 695 13 512 T2 proposes a further connecting device which permits contacting of a part of a radio communication unit to/with an electrical circuit. That connecting device aims at a permanent connection, it is not designed for frequent, flexible separation and connection, as would be required for example between a mobile telephone holder and a base member which can be mounted at a stationary position in a motor vehicle.

In the case of the other connecting device disclosed in EP 0 578 099 A1, a releasable coaxial plug connector element is pushed on to the pin of a pin strip array. As the plug element must be pushed on to the pin with a very high degree of accuracy, that kind of mechanical connection is not suitable for connecting a mobile telephone holder to a base member which can be stationarily mounted in a motor vehicle.

DE 199 45 176 A1 which is not a prior publication discloses a connecting device in the form of an arrangement of spring contacts in a predetermined grid pattern. Those spring contacts serve to pick up signals on a printed circuit board (PCB) and transmit them to a measuring device. There is no provision for use with mobile telephones.

Other known high-frequency connecting devices are in the form of so-called coaxial plug connections. As the connecting elements, they have a plug and a socket. The plug and the socket each comprise an inner conductor and a sleeve-like outer conductor which serves for shielding purposes. In the connecting position the inner conductors and the outer conductors of the plug and the socket engage one into the other in axially contacting relationship. A dielectric layer is arranged between the inner conductor and the outer conductor. The dielectric layer is in the form of a coating on at least one of the outer and inner conductors of the plug and the socket. The coaxial connectors with components which engage one into each other are thus relatively complex and are of a filigree structure, and they are also susceptible to wear.

Known coaxial connectors of that kind are frequently employed for uses inter alia also in telecommunication devices as in mobile telephone devices, for example hands-free speaker devices in motor vehicles. The coaxial connection serves for the transmission of the antenna signals between the mobile telephone and a holding cradle which is designed for temporarily receiving the mobile telephone, in practice being referred to just as the cradle, and also for transmission of those signals between the cradle and a base member which is mounted fixedly to the motor vehicle and to which the cradle can connecting elements, which are be coupled for holding purposes. The fixedly installed in those components, of the coaxial connectors, more specifically the socket and the plug, are susceptible to wear and fouling. In practice, it frequently happens that the socket becomes clogged and blocked by particles of dust or that condensate water accumulates therein. Furthermore, in practical use, mechanical damage sometimes occurs due to bending of the filigree components of those plug connections. There are thus also handling disadvantages when inserting and removing the mobile telephone into and from the cradle and when fitting the cradle on the base member which is fixed with respect to the vehicle and releasing the cradle therefrom, for, simultaneously with the steps of connecting and releasing the mechanical coupling devices, the respective electrical coaxial connection also has to be made or released respectively. Added to that is the fact that, in addition to the electrical power supply and signal conduction, further electrical connecting devices also have to be provided between the mobile telephone and the cradle and between the cradle and the base portion respectively, and those further electrical connecting devices also have to be handled automatically when mechanically connecting and releasing the components. Those further electrical connecting devices are of a different structure and operate differently from the coaxial connectors used, whereby the specific design structure and handling when coupling and releasing that overall complex arrangement are made still more complicated.

The object of the present invention is to improve a mobile telephone device in such a way that handling when releasing and connecting the mechanical and at the same time electrical coupling between the cradle and the base member which can be fixedly mounted in the motor vehicle and/or between the mobile telephone and the cradle, can be carried out easily and involving a small amount of wear.

BRIEF SUMMARY OF THE INVENTION

The invention attains that object with the mobile telephone device set forth in claim 1. In some embodiments, the invention involves a mobile telephone device for the operation of mobile telephones in motor vehicles, for example private automobiles, buses and trucks and other utility vehicles, preferably a hands-free device.

The mobile telephone device provides electrical for electrical connection of the base member which connecting devices can be stationarily mounted in the motor vehicle to the holder which temporarily receives a mobile telephone and which is generally in the form of a cradle and/or for electrical connection of the mobile telephone and the holder in the form of the cradle. With a mechanical structure which is in principle the same, the connecting devices can be in the form of coaxial connectors or non-coaxial electrical connecting devices. They each involve contact connectors which in the connection position are in contact with their front ends.

The two connecting elements each have a dielectric body in which a plurality of parallel separate conductors which are arranged at a spacing relative to each other are disposed.

The designs which are not in the form of coaxial connectors can be used for power supply or for signal transmission between the components of the mobile telephone device. They can be designed in such a way that the various conductors are arranged in one or more rows without it being important for the assembly to involve a symmetrical or coaxial arrangement of the conductors. The conductors which extend in the dielectric and which, in the connecting position, co-operate with each other at their ends, form multi-wire contact connectors.

Further configurations which are in the form of coaxial connectors have a structure with an inner conductor and an outer conductor and are used in the mobile telephone device as a coaxial connector for passing the antenna signals between the mobile telephone and the cradle and the cradle and the base member fixed to the vehicle respectively.

Instead of the conventional sleeve-shaped shielding in the plug and the socket, the coaxial connecting device now has an outer conductor means comprising a plurality of separate outer conductors. In order to achieve a good shielding effect, it is provided that the outer conductors are arranged in mutually parallel relationship and respectively at a spacing from and parallel to the inner conductor.

This means that this novel coaxial conductor is constructed in the manner of a multi-wire electrical connector. A particularly simple structure which is advantageous in terms of production engineering is afforded if the inner conductor of the connecting element, in regard to its mechanical structure, is in the form of an identical conductor to each of the outer conductors of the same connecting element and if the conductors are arranged in rows, wherein each of the rows has at least three conductors. In these constructions, the central conductor is in the form of the inner conductor. As an alternative to those constructions in which the conductors are arranged in parallel rows, constructions are also provided in which the outer conductors are arranged concentrically in a circular arrangement around the inner conductor.

A substantial advantage is that, in the connecting position, the associated outer conductors and the inner conductors of the connecting elements are arranged in axially mutually aligned relationship and co-operate with their ends which face towards each other. The coaxial connector can thus be in the form of a contact device which in the connecting position is in butting relationship. Preferably the ends which face towards each other in the connecting position are in the form of contact ends exclusively in their axially outermost region. It can be provided that in the connecting position they touch each other in a common contact surface which can preferably extend substantially perpendicularly to the axial extent of the outer and inner conductors. This means that the axial end faces bear against each other for example in surface contact. Those end faces can be flat but they can also be of a complementarily curved configuration. If those end faces are provided exclusively in the end region of the co-operating outer conductors and inner conductors of the connecting elements, the common contact surface generally extends perpendicularly to the axial extent of the conductors in question. In addition, there are particularly advantageous embodiments in which in the connecting position the contact ends touch each other at a common contact point or at a common contact line. That is the case if the one contact end is in the form of a flat end face and the other contact end is in the form of a part-spherical portion or a point or an edge. Advantageously, those embodiments can forego socket-like receiving means and complementary plugs. For centering reasons however, in the case of certain design configurations, the contact ends can be so designed that they also engage one into the other to a greater or lesser degree in mutually complementary relationship without however having to provide the typical filigree plug-socket connection of the conventional coaxial plugs.

Substantial advantages upon use in the mobile telephone devices are thus afforded in that the connectors in each case can be in the form of contact connectors which are in contacting abutting relationship exclusively at the mutually facing ends, preferably in the axially outermost region of the ends, in the connecting position, and thus either the contact surfaces bear flat against each other or the contact surfaces come to bear against each other with contact points or contact dome portions in the connecting position, thereby affording easy handling when connecting and releasing the assembly simultaneously with mechanically coupling and releasing the mobile telephone and the cradle or the cradle and the base member respectively, and thereby also avoiding mechanical damage and wear of the connecting elements.

Embodiments in the form of coaxial connectors, which are particularly desirable from the point of view of structure and production engineering, are afforded if in one of the connecting elements the outer conductors and the inner conductor are arranged fixed in a dielectric body, preferably embedded therein, and in the other connecting element the outer conductors and the inner conductor are mounted supported movably, preferably resiliently, in a dielectric body. Those resiliently supported conductors can be in the form of so-called spring pins insofar as they are each in the form of multi-part bodies. They can have a receiving sleeve fixed in the dielectric body, a spring arranged in the receiving sleeve and a pin which is guided in the receiving sleeve and which is supported on the spring. A particularly high level of functionality is achieved if the pin-shaped conductors which are fixed in the dielectric body and which extend through the dielectric body are arranged flush in the region of their contact end in the end face of the dielectric body which is provided on the contact side, and the resiliently supported contact pins which are arranged in the other connecting element and which extend through the dielectric body of their connecting element are arranged with their contact end projecting in the form of resilient contact heads beyond the end face provided at the contact side of that connecting element, and in the connecting position in the contact condition are pushed in, with the associated contact pin, against the force of the spring thereof, in the direction of the dielectric body. That compensates for manufacturing tolerances of the components provided with the connecting elements, in the connecting position, and ensures respective electrical contact in the connecting position.

In order to guarantee centering in the connecting position, it is possible to provide different measures, for example a centering device which can also at the same time or alternatively be in the form of a mechanical coupling device can be connected to the connecting elements or a portion connected thereto. A centering pin can be provided for example between the connecting elements, the centering pin engaging into a complementary opening in the connecting position. Such a centering pin can be in the form of a separate centering pin in the region of or outside the connecting elements carrying the electrical conductors. Alternatively or in addition one or more of the conductors, that is to say an outer conductor or an inner conductor, can also take over the function of a centering pin. That can be effected insofar as the conductor or conductors in question engages into one or more complementary openings in the connecting position. Those openings can be provided in the region of the contact ends, for example by virtue of correspondingly complementary, for example spherical, contact faces. Alternatively or additionally all contact ends of the conductors of the two connecting elements can also be in a complementary, for example curved common surface, in order to provide a centering effect in the connecting position.

BRIEF DESCRIPTION OF THE DRAWINGS

Embodiments of the invention are described in greater detail hereinafter with reference to drawings in which:

FIG. 5 is a transparent perspective view showing the principle of the connecting elements of FIGS. 1 through 4, FIG. 6 is a detail view in section of one of the resilient contact pins of the connecting device in FIGS. 1 through 5.

FIG. 9 is an exploded diagrammatic view of an embodiment of a hands-free device with various electrical contact connecting devices.

DETAILED DESCRIPTION OF THE INVENTION

Reference is first made to FIGS. 1 through 6 and the connecting device 101 illustrated therein is described in regard to its structure and function. It can be used in the illustrated embodiment in the form of a coaxial connector in a high-frequency line, for example an antenna line. It comprises a first connecting element 101a and a second connecting element 101b which in the connecting position are in touching contact with each other at their ends with their mutually facing contact sides (see FIG. 2).

Figure 1:
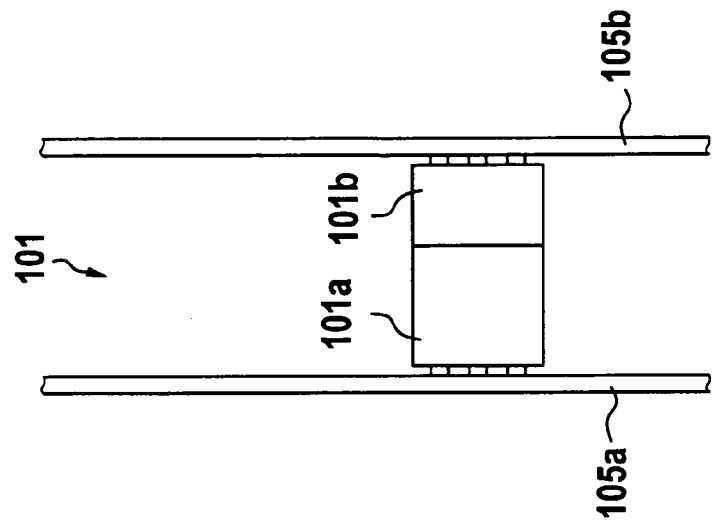
FIG. 1 is a diagrammatic exploded view of an embodiment of an HF-connecting device for use in a mobile telephone device according to the invention, as a side view, with the connecting elements being mounted on printed circuit boards.
Figure 2:
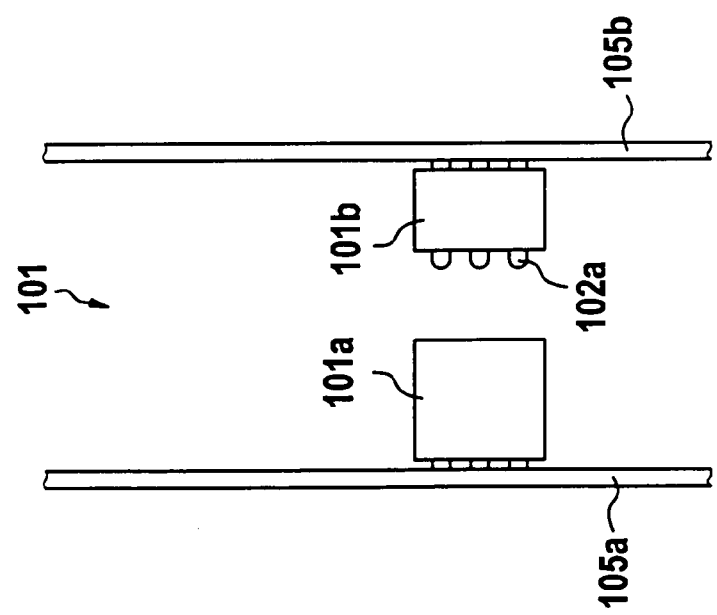
FIG. 2 is a view corresponding to FIG. 1 of the connecting device, but in the connecting position of the connecting elements.
Figure 3:
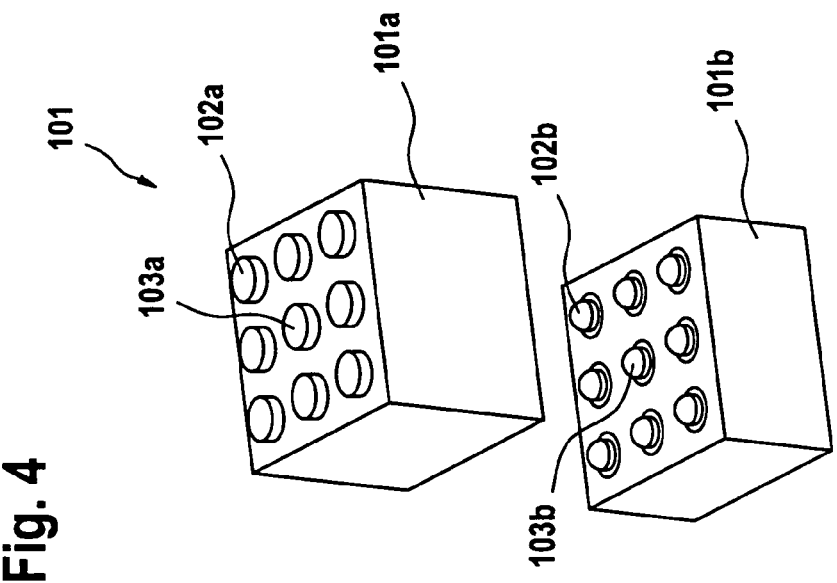
FIG. 3 is a perspective view on an enlarged scale of the connecting elements of the connecting device in FIGS. 1 and 2.
Figure 4:
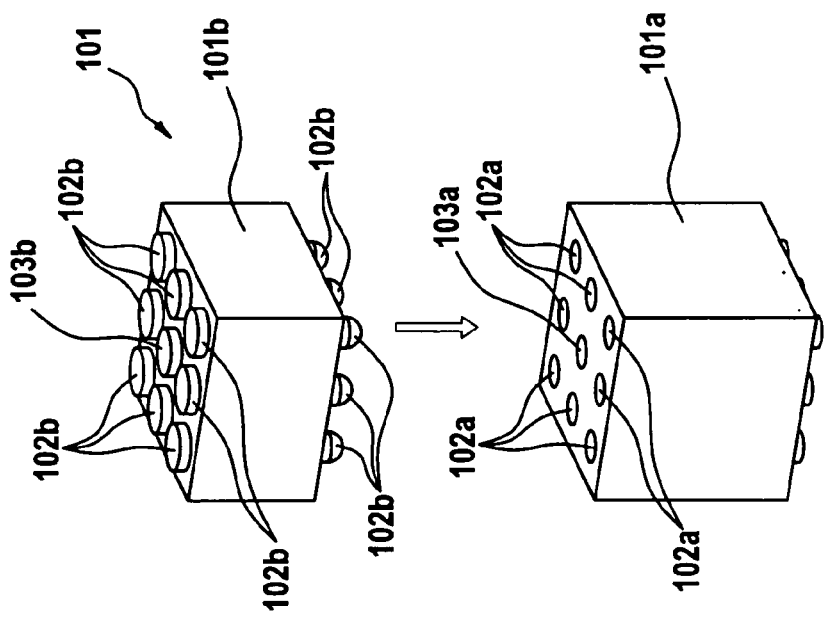
FIG. 4 is a view corresponding to FIG. 3 of the connecting elements in FIG. 3, but viewing at an angle from below in FIG. 3.

The connecting elements 101a, 101b are mounted on printed circuit boards 105a and 105b in the installed position shown in FIGS. 1 and 2.

The printed circuit boards 105a, 105b can be mounted in the parts of the equipment (not shown in FIG. 1), which are brought together to form the HF-connection, and are preferably mechanically coupled.

The two connecting elements 101a and 101b are in the form of coaxial connecting elements. Each of those two coaxial connecting elements 101a, 101b has a dielectric body which is in the form of a respective parallelepipedic block of square cross-section (see FIGS. 3a and 5). In the illustrated embodiment, embedded in the dielectric body in each connecting element 101a, 101b are nine respective conductors 102a, 103a; 102b, 103b. In the illustrated case those nine conductors are arranged in three parallel rows, with three conductors in each row. The outer conductors 102a, 102b are arranged relative to each other in a configuration which is of square cross-section. The central conductor 103a, 103b extends through the center of that square configuration. The first connecting element 101a thus has eight such outer conductors 102a and a central conductor 103a. The second connecting element 101b in a corresponding fashion has eight outer conductors 102b and a central conductor 103b. Adjacent conductors of a row are each at the same spacing. The conductors respectively extend in axial parallel relationship and in the axial direction through the dielectric body perpendicularly to its square cross-sectional area. In the connecting position of the two connecting elements 101a, 101b the nine conductors 102a, 103a of the first connecting element are aligned with the nine conductors 102b, 103b of the second connecting element 101b. The central conductor 103a, 103b in each case forms the inner conductor of the coaxial connection. The outer conductors 102a, 102b form the shielding which is connected to ground, in this coaxial connection.

In the first connecting element 101a the conductors 102a, 103a are in the form of pins which are fixedly embedded in the dielectric body. These involve metal pins, for example of gold-plated copper. They are each of an identical configuration. Their axial ends are disposed in the region of the ends of the dielectric body. They have contact ends which, in the connecting position of the HF-connecting device, are towards the second connecting element 101b and are in touching contact with the contact ends of the conductors 102b, 103b of this second connecting element 101b.

Those contact ends of the pins have a flat contact surface and are flush with the end face of the dielectric body. The other ends of those conductor pins 102a, 103a are in the form of connection ends which project beyond the end face arranged at that side of the dielectric body and, in the installation position shown in FIGS. 1 and 2, are connected to a printed circuit board 105*a*, for example by way of solder joins. In this case they can be connected to a coaxial line which is laid on the printed circuit board or connected thereto.

The conductors 102*b*, 103*b* of the second connecting element 101*b* are in the form of resiliently supported pins. They are each identical to each other. As shown in detail in FIG. 6 each resilient pin comprises a receiving sleeve h, a coil compression spring f disposed in the receiving sleeve and a pin s which is axially displaceably guided in such a way as to engage into the receiving sleeve h. At its inside, the pin s has a mounting recess into which the spring 4 which is supported against the bottom of the receiving sleeve h engages with its upper end in order to be supported there. The pin s has a collar-shaped edge which in the position shown in FIG. 6 bears against the inside of the upper, inwardly bent edge of the sleeve h. The receiving sleeve h is fixedly embedded in the dielectric body. In this case the bottom of the receiving sleeve h projects beyond the end of the dielectric body and forms the connection end which, in the installation position in FIGS. 1 and 2, is connected to a printed circuit board 105*b* by way of a solder join. The free end of the pin s which is mounted resiliently in the receiving sleeve h projects somewhat beyond the end of the dielectric body, in the non-connecting position. That free end forms the contact end which, in the connecting position of that HF-connecting device 101, is in touching contact at the associated contact end of the associated conductors 102*a*, 103*a* of the connecting element 101*a*. In this arrangement the resiliently supported pin is pushed somewhat into the dielectric body of the connecting element, against the force of the spring.

Figure 7:
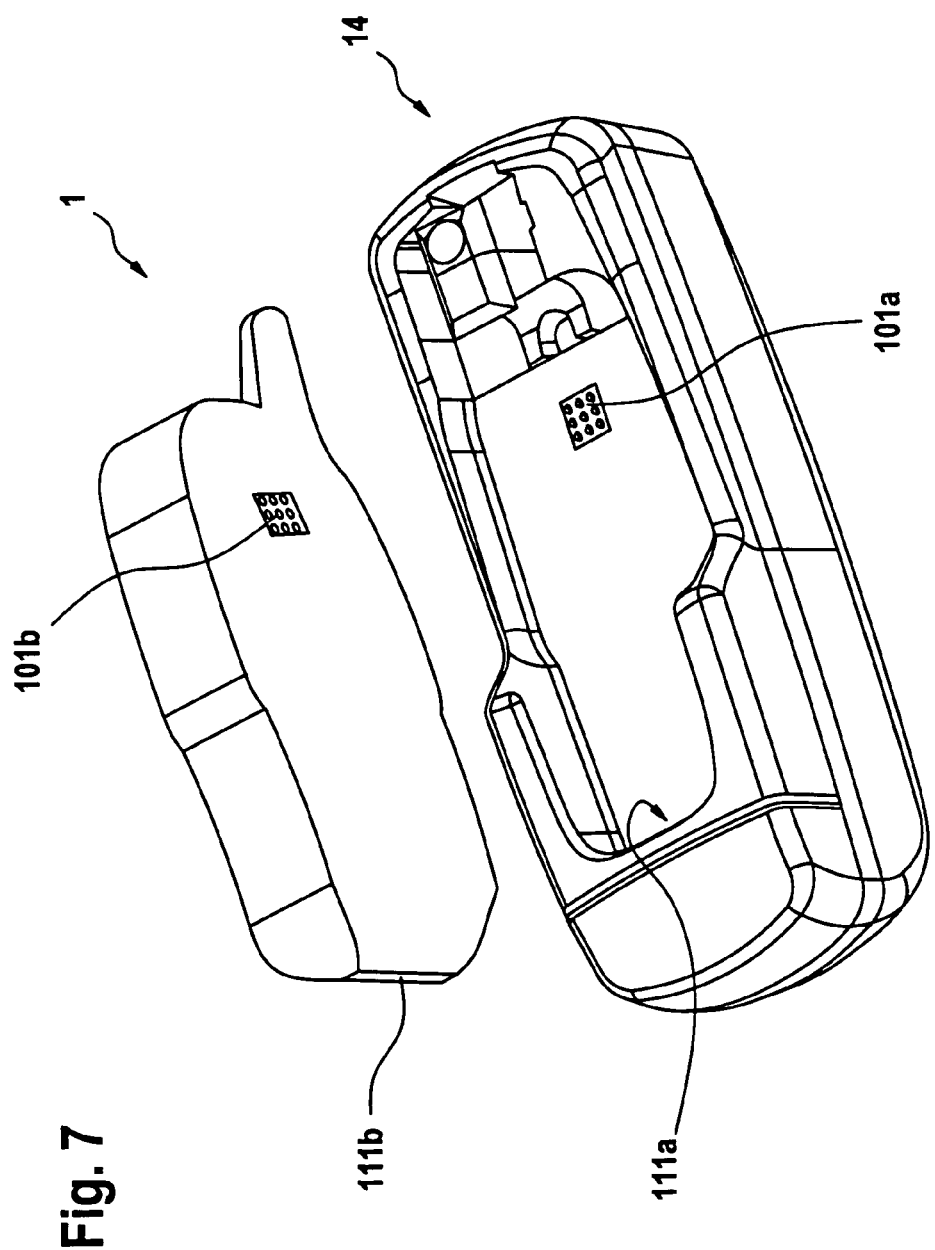
FIG. 7 is a perspective exploded view of a holding shell in the form of a cradle with mobile telephone of a mobile telephone device with hands-free device for use in a motor vehicle, comprising an HF-connecting device as shown in FIGS. 1 through 6 and a similarly constructed second electrical connecting device which however is not in the form of a coaxial connection.

In the embodiment shown in FIG. 7 the HF-connecting device 101 forms the HF-connection between a mobile telephone 1 and a cradle 14 which is in the form of a holding cradle for the mobile connecting element 101*a* with the fixed pins and the telephone 1. The first generally flat contact surface is fixed in the bottom of the cradle 14, which bottom is towards the underside of the mobile telephone 1. The printed circuit board 105*a* on which the connecting element 101*a* is arranged (see FIGS. 1 and 2) is fixed in the cradle 14. The second connecting element 101*b* with the spring pins is fixed in the underside of the mobile telephone 1. The printed circuit board 105*b* (see FIGS. 1 and 2) is an integrated component part of the mobile telephone 1. The arrangement of the connecting elements 101*a*, 101*b* is such in each case that the end face of the dielectric body is flush with the bottom of the receiving means of the cradle 14 and the underside of the mobile telephone 1 respectively. The contact ends of the conductor pins which are fixed in the connecting element 101*a* are flush with the end face of the dielectric body so that accordingly the entire end and contact face of the connecting element 101*a* is flush with the bottom of the receiving means of the cradle 14 and therefore there are no recesses or projections present in the region of the connection of that coaxial connecting arrangement. The contact ends of the resiliently supported pins of the connecting element 101*b* mounted in the underside of the mobile telephone 1 project beyond the face of the dielectric body thereof, in the non-connecting position. As the end face of the dielectric body is flush with the underside of the mobile telephone 1 the contact ends of the nine resilient contact pins form projecting resilient heads while the remaining region of that connecting element 101*b* is flush with the underside of the mobile telephone.

In the position of the mobile telephone 1 in which it is fitted into the cradle 14 but which is not shown in FIG. 7, the mobile telephone 1 is latched in positively engaging relationship into the complementary receiving means of the cradle 14, the receiving means being of an undercut configuration in region-wise manner. In that case, the underside of the mobile telephone 1 lies on the bottom of the receiving means, more specifically in particular in the region in which the connecting elements 101*a*, 101*b* are arranged, so that, in the position of the mobile telephone in which it is fitted into the cradle, the contact heads of the conductor pins 102*b*, 103*b* bear against the contact surfaces of the conductor pins 102*a*, 103*a*. The resiliently supported contact pins (see FIG. 6) are in that case pushed into their respective receiving sleeve h to a greater or lesser degree against the mounting springs f thereof. In the connecting position which is diagrammatically shown in FIG. 2, the HF-connection is made between the mobile telephone 1 and the cradle 14. Connected to the printed circuit board 105*a* arranged within the cradle 14 is an antenna line (not shown) which is connected to an external on-board antenna of the motor vehicle, that is to say an external antenna which is arranged outside the interior of the vehicle.

Figure 8:
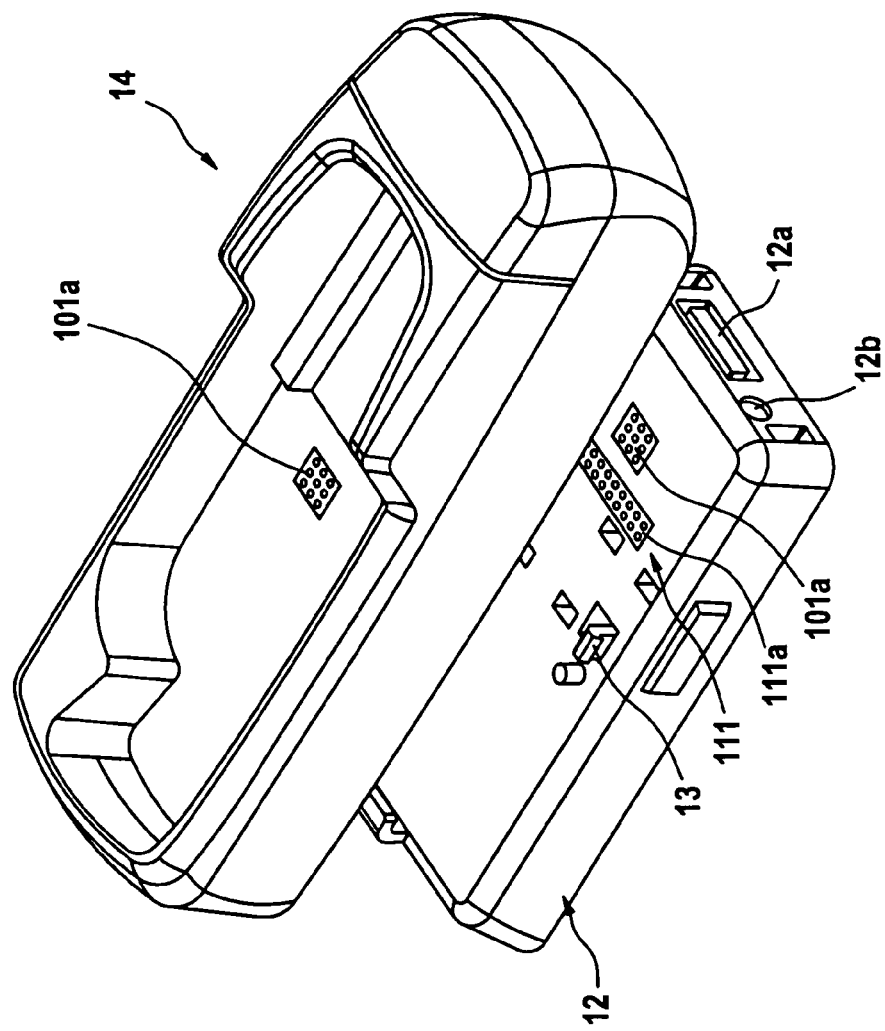
FIG. 8 is a perspective view of the cradle of FIG. 7, but without a mobile telephone, but with a bracket which can be mounted fixedly to a vehicle, with an HF-connecting device and a second similarly constructed electrical connecting device which however is not in the form of a coaxial connecting device, and hands-free device with the various electrical contact connecting devices.

As shown in FIG. 8, there is provided a base member 12 which can be mounted stationarily, in particular in a motor vehicle, and on which the cradle 14 can be mounted by way of a mechanical latching connection. An HF-connecting device 101 is also provided between the base member 12 and the cradle 14. It is also of an identical configuration to the HF-connection 101 described with reference to FIGS. 1 and 2. For that purpose, a connecting element 101*a* is arranged in the top side of the base member 12 and a connecting element 101*b* is arranged in the underside of the cradle 14. The connecting elements 101*a*, 101*b* are here also installed in such a way that the end face is flush with the installation faces at the top side of the base member 12 and at the underside of the cradle 14 respectively. In this case also the printed circuit boards 105*a* and 105*b* are fixed in the base member 12 and the cradle 14 respectively. Electrical contact between the connecting elements 101*a*, 101*b* and thus the HF-connection is achieved in the mechanical latching position between the cradle 14 and the base member 12.

Mechanical coupling of the cradle 14 and the base member 12 is effected by way of a special latching device. As shown in FIG. 8, this device can be designed in such a way that latching noses 13 which are arranged on the base member 12 and which are positioned to project at the top side of the base member 12 automatically latchingly engage into latching recesses at the underside of the cradle 14 when the cradle 14 is fitted on to the base member 12.

Provided at the end of the base member 12 is a coaxial connection socket 12*b* for the connection of an antenna cable for connection to an external antenna, for example an external on-board antenna of a vehicle. That connection socket 12*b* is in the form of a conventional coaxial socket. It is connected by way of the printed circuit board 105*a* to the connecting element 101*a* of the HF-connection 102.

As can be seen from FIG. 8, also provided in the base member 12 at a spacing relative to the HF-connecting device 101 is a further electrical contact connecting device 111. Unlike the connecting device 101, it is not in the form of a coaxial connecting device but it is in the form of a multi-wire electrical power supply and signal line connecting device, more specifically in the form of a so-called low-frequency connection, referred to for brevity as an LF-connection. It comprises a connecting element 111*a* arranged in the top side of the base member 12 and a connecting element 111b (not shown in FIG. 8) arranged in the underside of the cradle 14. In terms of their structural configuration, those two connecting elements 111a, 111b correspond to the connecting elements 101a and 101b respectively insofar as they each have a corresponding dielectric body in which contact pins are fixedly embedded, in the case of the connecting element 111a, and in the case of the connecting element 111b resilient contact pins are supported in the dielectric body. Unlike the HF-connecting device 101, in the electrical connector 111 the dielectric bodies are each a parallelepiped of an elongate rectangular configuration in cross-section. The contact pins of the connecting element 111 a and the resilient contact pins of the connecting element 111b are respectively arranged in only two rows, each with eight fixed contact pins and eight resilient contact pins respectively. Those pins respectively form the conductor wires of the electrical connection. Unlike the HF-connection 101, they are not in the form of inner and outer conductors for forming a shielding means, but only in the form of separate wires of that multi-wire electrical connection. The connecting device 111 therefore forms a non-coaxial electrical connection-13 for power supply and electrical signal conduction. The connecting elements 111a and 111b are connected to printed circuit boards 105a and 105b respectively in a corresponding manner to that shown for the HF-connecting device in FIGS. 7 and 8. The printed circuit boards 105a and 105b are fixedly arranged in the base member 12 and the cradle 14 respectively. In a modification in relation to FIG. 8, the LF-connecting device 111 and the HF-coaxial connecting device 101 can be provided in a common structural unit, that is to say, the connecting elements 111a and 101a and the connecting elements 111b and 101b can each be in the form of a respective structural unit in a respective combined connecting element a and b respectively, preferably with a common dielectric body a and b respectively, for example in the form of an elongate parallelepipedic body.

As FIG. 8 shows the base member 12 has at its outer end adjacent to the coaxial socket 12b a conventional connecting socket 12a. That socket 12a is electrically connected to the connecting element 111a by way of the printed circuit board 105a.

As can be seen from FIG. 7 a non-coaxial electrical contact connecting device 111 is also provided between the mobile telephone 1 and the cradle 14. It can be of the same configuration as the contact connection 111 described with reference to FIG. 8. In FIG. 7 it serves for electrical connection of the mobile telephone 1 to the cradle 14. The connecting element 111b is arranged in the base end of the mobile telephone 1 and the connecting element 11a is arranged in the associated end region of the receiving means 14a of the cradle.

Described hereinafter with reference to FIG. 9 is the basic structure of the mobile telephone device with hands-free device, in which, as a preferred situation of use, the above-described contact connections 101, 111 are employed. The illustrated mobile telephone device with hands-free device is designed in such a way that replacement of the mobile telephone by a mobile telephone of a different type can be implemented in a particularly simple fashion. The mobile telephone device includes a mobile telephone holding arrangement with a base member 12 which can be stationarily mounted in the vehicle, for example to the instrument panel, to the central console or in the armrest, and a holding casing member 14 which is in the form of a so-called cradle and which is specifically designed to receive a mobile telephone 1 (see FIG. 2), more specifically for the type of mobile telephone used. The mobile telephone holding arrangement with cradle 14 and base member 12 with the contact connectors 101, 111 has already been described hereinbefore with reference to FIGS. 7 and 8.

As shown in FIG. 9, the base member 12 is connected to an interface box 16 by way of a bus connection 22. The interface box 16 contains the so-called interface module representing the central control unit of the entire mobile telephone device including the electronic hands-free and charging system. The interface box 16 is connected to the on-board vehicle power supply system by way of an electrical connection (not shown), inter alia for control of the loudspeaker and the microphone of the hands-free device and a voice recognition device. The vehicle on-board power supply system can have a vehicle bus to which the hands-free device can be connected in order to communicate with other components by way of the bus. The interface box 16 is mounted fixedly in the vehicle, for example behind or under the instrument panel or in the trunk space.

FIG. 9 does not show the loudspeaker and the microphone of the hands-free device. They can be arranged separately in the vehicle. The microphone is preferably arranged in the upper region of the passenger compartment in the vehicle roof or in the region of the sun visor. The loudspeaker of the hands-free device can also be arranged separately in the passenger compartment; it is however also possible to provide that the loudspeaker of the automobile radio can be switched as a loudspeaker of the hands-free device and it is also possible for a microphone of the automobile radio installation to be used as a hands-free microphone.

The device is so switched that, when the mobile telephone is fitted in the cradle 14, the hands-free mode is activated, that is to say the hands-free loudspeaker and the hands-free microphone are switched on. When the mobile telephone is removed from the cradle 14 or when the cradle is removed from the base member 12, switches over from hands-free mode into the arrangement automatically private mode in which the hands-free microphone and the hands-free loudspeaker are switched off and telephoning is effected in the private mode by way of the microphone and the loudspeaker of the mobile telephone.

As already mentioned, the mobile telephone device in FIG. 1 involves a hands-free device which can be universally employed for various types of mobile telephone. The components which are fixedly installed in the vehicle, that is to say the interface box 16, and the base member 12, are designed for that purpose independently of the type of mobile telephone and they remain installed unchanged in the motor vehicle, when the mobile telephone is exchanged. Only the cradle 14 which preferably has mobile telephone-specific software is type-specifically designed for the mobile telephone. The cradle 14 forms a connection unit which is designed specifically for the mobile telephone and which therefore also has to be exchanged, when the mobile telephone is exchanged.

What is claimed is:

1. A mobile telephone device for the operation of mobile telephones in motor vehicles, comprising:
   a mounting device which can be installed in the motor vehicle having a base member configured to be stationarily mounted in the motor vehicle, and
   a holding means, preferably a holding cradle, for temporarily receiving the mobile telephone,
   wherein an electrical connecting device is provided between the mobile telephone and the holding means for temporarily receiving the mobile telephone and/or between the holding means for receiving the mobile telephone and the base member, for making the electrical connection;

the electrical connecting device has a first connecting element and a second connecting element, with each of the connecting elements having a dielectric body in which two or more separate conductors, which are arranged parallel and at a distance from one another and are in the form of pins, are arranged, and form an inner conductor, which is in the form of a pin, and two or more outer conductors, which form a coaxial screen and are in the form of pins, with dielectric of the dielectric body being connected between the inner conductor and the outer conductor, with the first connecting element and the second connecting element interacting in a connected position forming an electrical connection in that the conductors which are in the from of pins on the first connecting element make a touching contact with the conductors which are in the form of pins on the second connecting element with their mutually facing ends aligned with one another, and with at least the outer conductors which are in the form of pins and/or the inner conductor which is in the form of a pin being resiliently movably mounted such that they or it can move in a sprung manner in the dielectric body in at least one of the connecting elements.

2. The mobile telephone device as set forth in claim 1, wherein the connecting device is part of a high-frequency line.

3. The mobile telephone device as set forth in claim 1, wherein the outer conductor means of the first connecting element and the outer conductor means of the second connecting element each have a tow or more separate outer conductors.

4. The mobile telephone device as set forth in claim 3, wherein the separate outer conductors are arranged at a distance from one another and parallel to each other and at the same time are each arranged at a distance from the inner conductor and parallel thereto.

5. The mobile telephone device as set forth in claim 4, wherein each outer conductor of the first connecting element is associated with in each case one outer conductor in the second connecting element, and the mutually associated outer conductors are in each case arranged such that they are aligned with one another in the connected position, with their facing ends interacting.

6. The mobile telephone device as set forth in claim 1, wherein the conductors are arranged in two or more parallel rows, with each row having at least three conductors and with at least two and preferably three parallel rows being formed.

7. The mobile telephone device as set forth in claim 1, wherein the connecting device is in the form of an HF-connecting device in that at least one of the conductors in the first connecting element and in the second connecting element is in each case in the form of an inner conductor and two or more conductors which are arranged around said inner conductors are in the form of outer conductors which form a coaxial shielding, with the inner conductors and the outer conductors of the two connecting elements each being arranged such that they are aligned with one another in the connected position, with their facing ends making a touching contact with one another.

8. The mobile telephone device as set forth in claim 1, wherein the ends, which face towards each other in the connecting position, of the inner conductors and the outer conductors and preferably in each case exclusively the axially outermost region of the ends, are in the form of contact ends which make a contact with one another in the connected position.

9. The mobile telephone device as set forth in claim 1, wherein the mutually touching contact ends are designed such that
   a) in the connecting position they touch each other, preferably exclusively on a common contact surface, which extends substantially perpendicularly or at an angle to the axial extent of the outer conductors and inner conductors and/or
   b) in the connecting position they touch each other, preferably exclusively in a common contact point or in a common contact line, wherein at least one of the two touching contact ends has a contact surface which extends substantially perpendicularly or at an angle to the axial extent of the outer conductors and the inner conductors.

10. The mobile telephone device as set forth in claim 1, wherein more than two outer conductors are arranged around the inner conductor in at least on one of the connecting elements, with adjacent outer conductors each being arranged at the same distance from one another and/or the outer conductors which surround the inner conductor each being arranged at least approximately the same distance from the inner conductor.

11. The mobile telephone device as set forth in claim 1, wherein in at least one of the connecting elements, the outer conductors are arranged to extend through edges, preferably corner points of a fictional rectangle in the cross-sectional plane of the connecting element, preferably a square or another regular polygon or a circle, wherein the inner conductor is arranged to extend on a central axis of said configuration.

12. The mobile telephone device as set forth in claim 1, wherein the outer conductors of the first connecting element are respectively identical.

13. The mobile telephone device as set forth in claim 1, wherein the outer conductors of the second connecting element are respectively identical.

14. The mobile telephone device as set forth in claim 1, wherein the outer conductors of the first connecting element are of a different configuration from the outer conductors of the second connecting element.

15. The mobile telephone device as set forth in claim 1, wherein the inner conductor, in regard to a mechanical structure, is an identical conductor to at least one of the outer conductors of the same connecting element, preferably to each of the outer conductors of the same connecting element.

16. The mobile telephone device as set forth in claim 15, wherein the inner conductor of the connecting element, in regard to a mechanical structure, is an identical conductor to each of the outer conductors of the same connecting element and in that the conductors are arranged in rows, wherein each of the rows has at least three conductors.

17. The mobile telephone device as set forth in claim 1, wherein in at least one of the connecting elements, at least one of the outer conductors and/or the inner conductor are/is fixed in a dielectric body, preferably are/is arranged embedded therein.

18. The mobile telephone device as set forth in claim 1, wherein the outer conductor and/or the inner conductor of at least one of the two connecting elements has a multi-part body, preferably with a receiving sleeve (h) fixed in the dielectric body, a spring (f) arranged in the receiving sleeve (h) and a pin (s) which is guided in the receiving sleeve (h) and supported on the spring (f).

19. The mobile telephone device as set forth in claim 1, wherein at least one of the outer conductors and/or the inner conductor of the one connecting element are/is respectively in the form of a body resiliently supported in a dielectric body and the outer conductors and the inner conductor of the other connecting element are in the form of bodies fixedly embedded in a dielectric body of the second connecting element.

20. The mobile telephone device as set forth in claim 1, wherein at least one of the outer conductors and/or the inner conductors of at least one of the two connecting elements extends through the dielectric body and the contact end is arranged flush with an end face of the dielectric body or is arranged to project beyond the end face of the dielectric body.

21. The mobile telephone device as set forth in claim 20, wherein the end face of the dielectric body is flat or curved, preferably arranged such that is curves outwardly or inwardly, preferably with the end face of the dielectric body being arranged at least substantially perpendicularly to the axial extent of the inner conductor and/or the outer conductor.

22. The mobile telephone device as set forth in claim 1, wherein a centering apparatus or a mechanical coupling apparatus, which is connected to the connecting elements or to a part that is connected to them, is provided for mutual centering and/or mechanical coupling of the connecting elements in a connected position.

23. The mobile telephone device as set forth in claim 1, wherein the base member can be mounted to a surface selected from a group consisting of the instrument panel, the central console, the armrest, in or to the glove compartment, in or to a door, and the inside of a vehicle door.

24. The mobile telephone device as set forth in claim 1, wherein the mobile telephone is a hands-free device.

* * * * *